United States Patent
Chaperon

(10) Patent No.: US 7,860,299 B2
(45) Date of Patent: Dec. 28, 2010

(54) METHODS AND APPARATUS FOR IMAGE PROCESSING

(75) Inventor: Thomas G. Chaperon, Paris (FR)

(73) Assignee: Trimble AB, Danderyd (SE)

( * ) Notice: Subject to any disclaimer, the term of this patent is extended or adjusted under 35 U.S.C. 154(b) by 1276 days.

(21) Appl. No.: 11/055,901

(22) Filed: Feb. 10, 2005

(65) Prior Publication Data

US 2006/0177121 A1    Aug. 10, 2006

(51) Int. Cl.
*G06K 9/00* (2006.01)
*G06T 15/00* (2006.01)

(52) U.S. Cl. ........................... 382/154; 345/419
(58) Field of Classification Search ............... 382/154; 345/419; 700/98; 703/2
See application file for complete search history.

(56) References Cited

U.S. PATENT DOCUMENTS

| | | | | |
|---|---|---|---|---|
| 6,407,735 B2* | 6/2002 | Kressin | ........... | 345/420 |
| 6,982,710 B2* | 1/2006 | Salomie | ........... | 345/420 |
| 7,003,136 B1* | 2/2006 | Harville | ........... | 382/103 |
| 7,286,679 B2* | 10/2007 | Fang et al. | ........... | 381/322 |

OTHER PUBLICATIONS

Chaperon et al., Extracting cylinders in full 3D data using a random sampling method and the Gaussian image. Proceedings of VMV 2001, held in Stuttgart, Germany, pp. 35-42.*

Kwon et al., Fitting range data to primitives for rapid local 3D modeling using sparse range point clouds, Automation in Construction, vol. 13(1), Elsevier, New York, USA, 2004, pp. 67-81.*

Marshall et al., Robust segmentation of primitives from range data in the presence of geometric degeneracy. IEEE Trans. Pattern Anal. Mach. Intell. 23(3), 2001, pp. 304-314.*

Jason Kantz, "Application of Sweeping Techniques to Reverse Engineering", Department of Computer and Information Science, The University of Michigan, Dearborn, Michigan, Dec. 19, 2003, 63 pages.

Y.F. Wu et al., "Modelling cloud data using an adaptive slicing approach", Computer-Aided Design, vol. 36, No. 3, Elsevier Publishers BV., Mar. 2004, pp. 231-240.

European Search Report and Communication citing the Kantz and Wu documents (see above), Jun. 11, 2007, 5 pages.

Letter responding to Oct. 8, 2009 Office Action for European Patent Application No. 06 290203.6, 5 pages, Jan. 29, 2010.

Communication pursuant to Article 94(3) EPC for European Patent Application No. 06 290203.6, 2 pages, Oct. 8, 2009.

Letter responding to Jan. 10, 2008 Office Action for European Patent Application No. 06 290203.6, 4 pages, Jun. 9, 2008.

Communication pursuant to Article 94(3) EPC for European Patent Application No. 06 290203.6, 1 page, Jan. 10, 2008.

* cited by examiner

*Primary Examiner*—Brian Q Le
*Assistant Examiner*—Soo Jin Park
(74) *Attorney, Agent, or Firm*—Cooper & Dunham LLP

(57) ABSTRACT

Methods and devices for processing image data stored as three-dimensional point clouds related to a scene by selecting a profile definable in a two-dimensional surface, and matching the profile to one or more subsets of the cloud of points to identify surfaces in the scene having the same profile so that data sets representing the successive matched surface portions can be generated to provide a surface model of all or part of the scene.

24 Claims, 12 Drawing Sheets

METHODS AND APPARATUS FOR IMAGE PROCESSING

BACKGROUND OF THE INVENTION

The present invention is concerned with image processing.

In industrial production environments, most installations and machinery are built according to plans. However, those installations and machinery tend to require upgrading over time and/or are subject to additions which may or may not be appropriately documented.

For certain applications, such as offshore platforms for instance, it is necessary when adding an additional element to be sure that it will fit in the existing installation.

To solve this problem, methods and apparatuses have been proposed to try and obtain "as-built" plans of these installation. Most recently, solutions involving laser photographing apparatuses have been proposed.

Practically, those solutions imply projecting a scanning laser beam on an installation being captured. At each laser position, the distance is derived from the time or the phase difference in the laser to-and-fro path to a reflecting point. After suitably scanning the scene, this results in a three-dimensional set of points, also referred to as "cloud of points", corresponding to the installation.

However, the cloud of points can only provide a general idea of the contour of the installation to a trained human eye. As far as rigorous planning and designing are concerned, the cloud of points is hardly usable as such.

BRIEF SUMMARY OF THE INVENTION

More specifically, it is desirable to obtain fast operating and low cost techniques to convert such clouds of points into computer data or files representing drawings or plane elements.

The subject invention aims at improving the situation.

The subject invention proposes a method of processing image data having the steps of: (a) storing a three-dimensional cloud of points related to a scene; (b) selecting a profile definable in a two-dimensional surface; and (c) matching the profile with the cloud of points, within a plurality of regions thereof, thus obtaining a plurality of sets of data representing successive matched surface portions.

Such a method of processing image data makes it possible to recognize regular shapes such as elongated profiles in a cloud of points. This method may be both precise and fast. In a particular embodiment, it matches the profile to selected smaller ranges, thus taking a small amount of time to perform the matching.

The method can also include the steps of: (a) defining a starting position of the profile in the cloud, and a range in the cloud, the range being adjacent to the starting position, and extending transversely to the two-dimensional surface; (b) determining a direction of matching, along which the profile substantially fits with cloud points within the range, the direction of matching and the profile defining a first set of data representing a matched surface portion, and an end position of the profile; and (c) selectively repeating the defining and determining steps, with the starting position being derived from a preceding end position, until a selected condition is met. In addition, the determining step can determine an angle defining the position of the profile within a plane perpendicular to the selected direction and the two-dimensional surface of the selecting step can be substantially planar. Also, the defining step can define the starting position of the profile in the cloud and the direction of extension of the range by four parameters, which can be: (1) the position of a reference point in the profile, (2 and 3) two angles defining a selected direction and the direction of extension of the range, and (4) one angle defining the position of the profile within a plane perpendicular to said selected direction.

Further, the determining step of the method can include the steps of: (a) projecting cloud points within the range along a selected direction on the two-dimensional surface; and (b) adjusting the selected direction to minimize a quantity related to the distances between the projected points and the profile; or (c) adjusting the selected direction and the angle to minimize a quantity related to the distances between the projected points and the profile.

Additionally, the method can include the step of deriving a three-dimensional curve from the sets of data representing successive matched surface portions. In this deriving step, the three-dimensional curve can be derived from the profile and from reference points in the profile contour.

Also, the method provides that in the defining step, the direction of extension is substantially opposite to that of the range, and that the determining and selectively repeating steps are selectively repeated.

Further, in the method, the sets of data representing matched surface portions and/or the three-dimensional curve are sent to a post processing unit for displaying an image representative of the surface portions.

The subject invention also proposes an image processing apparatus having: (a) a processor and a memory; (b) first data stored in the memory, representing a three-dimensional cloud of points related to a scene; (c) second data stored in the memory, representing a profile definable in a two-dimensional surface; (d) a matching function (which may be implemented by software code), adapted to receive parameters representing a starting position of the profile, and a range of points of the cloud adjacent to the starting position, and extending transversely to the two-dimensional surface, the matching function being capable of determining a matching direction, along which the profile substantially fits with cloud points within the range, the direction of matching and the profile defining a matched surface portion within the range, for storage in the memory; and (d) a controller (which may be implemented by software code) for calling (executing) the matching function with a first starting position and a first range, and for subsequently calling (executing) the matching function with further starting positions and ranges, such a further starting position being derivable from a preceding operation of the controller.

Also, the matching function of the apparatus can be capable of determining an angle defining the position of the profile within a plane perpendicular to the selected direction, and the two-dimensional surface can be substantially planar. In addition, the starting position of the profile in the cloud and the direction of extension of the range can be defined by four parameters, which can be: (1) the position of a reference point in the profile, (2 and 3) two angles defining a selected direction and the direction of extension of the range, and (4) one angle defining the position of the profile within a plane perpendicular to said selected direction.

Further, the matching function of the device can project cloud points within the range along a selected direction on the two-dimensional surface; and adjust the selected direction to minimize a quantity related to the distances between the projected points and the profile; or adjust the selected direction and the angle to minimize a quantity related to the distances between the projected points and the profile.

Additionally, the apparatus and/or the method can include or use: (1) a smoothing function for joining successive matched surface portions with a joining surface portion; (2) a post processing unit or function for displaying an image representative of said surface portions; (3) software code adapted to implement the controller and matching function; (4) a program storage device readable by a machine, tangibly embodying a program of instructions executable by the machine to perform the method; and/or (4) a computer data signal transmitted in one or more segments in a transmission medium which embodies instructions executable by a computer to perform the method.

This subject invention also encompasses software code and/or circuitry, adapted to implement and/or execute the steps of the above method, and the controller, matching function or other component of the above apparatus.

BRIEF DESCRIPTION OF THE SEVERAL VIEWS OF THE DRAWINGS

Features and advantages of the invention will appear in the detailed description below and in the appended drawings, in which.

These drawings form an integral part of the description of the present invention, and may serve by themselves to support features of the invention.

DETAILED DESCRIPTION OF THE INVENTION

Certain conventions in notation are used to refer to software entities in this description. For example, in the detailed description, the quote sign (") and/or italics may be used when deemed necessary for clarity, e.g. to distinguish between natural language and a software entity. Generally:

a software entity which starts with the symbol "$", is a variable, a data object or a data structure;

a software entity which starts with the symbol "$" and terminates with a bracket expression, e.g. $Pos(i) may be an array, or an equivalent data structure;

a software entity which does not start with the symbol "$", but terminates with a bracket expression, e.g. Get_Prof( ), is generally a procedure or function;

optionally, a procedure or function may be called with one or more arguments (parameters) indicated within the round brackets, e.g. Get_Rg($Pos(i));

undefined data are generally shown in italics.

Also, the references to functions, and the function names, are for convenience only. They do not imply the use of software code whose structure necessarily matches the functions as described hereinafter.

In the following, reference is made to a "profile". The term "profile" generally designates an assembly of profile elements; it designates the abstract notion of the profile as a shape/curve as well as data representing this shape/curve. It is to be noted that a sole profile element constitutes a profile as defined above.

Figure 1:
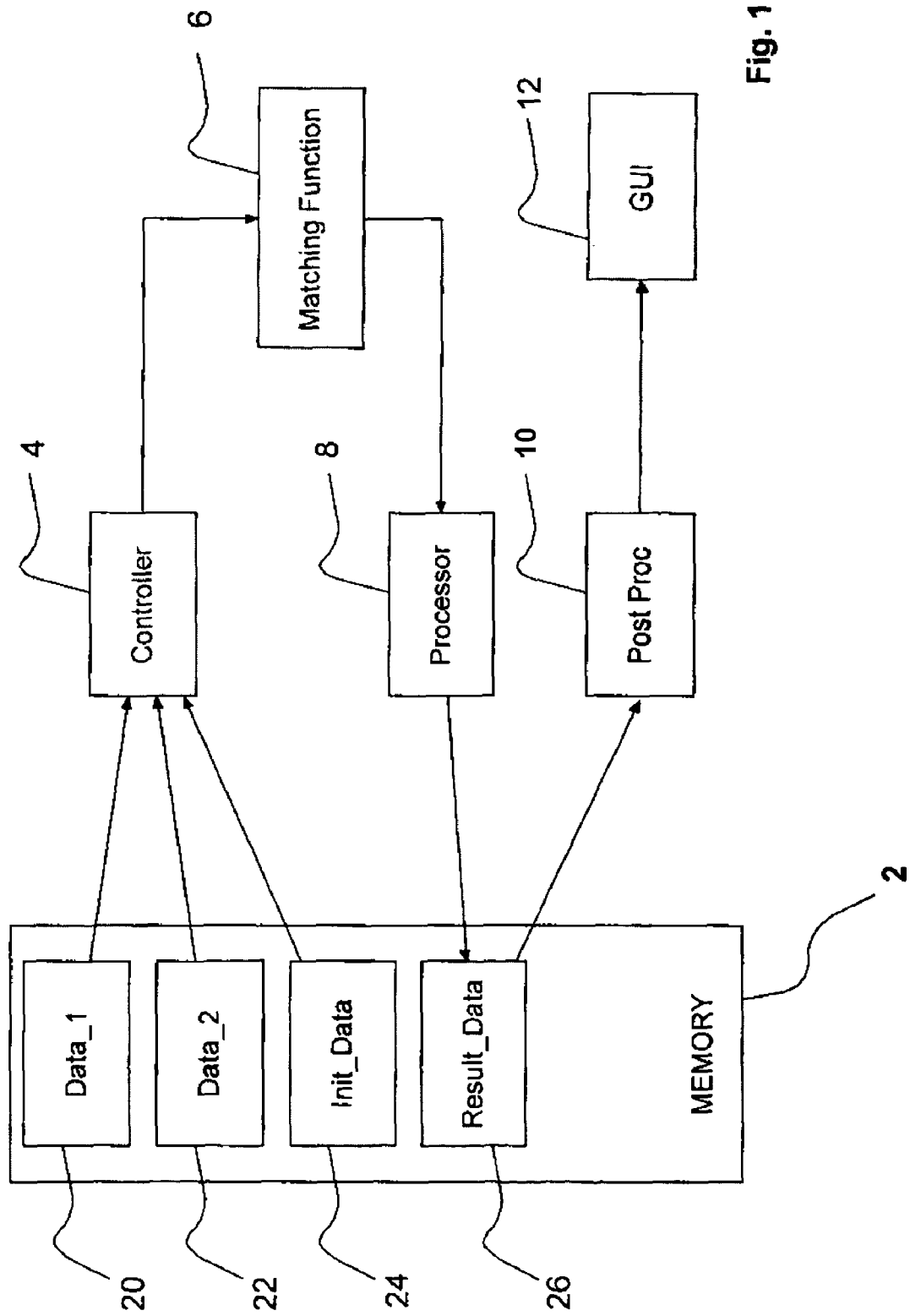
FIG. 1 shows an exemplary block diagram of an image processing apparatus.

As seen on FIG. 1, an image processing apparatus may comprise a memory 2, a controller 4, a matching function 6, a processor 8, a post-processing unit 10 and a graphic user interface 12. Memory 2 may comprise a mass memory and/or random access memory (RAM.).

Practically, memory 2 may contain three sets of data:

first data 20, or data_1, representing a set of three-dimensional pixel data or points, second data 22, or data_2, representing a profile, initialization data 24, or init_data, for use in defining an assumed start position of the profile, as defined by data_2, in the cloud of points as defined by data_1.

Controller 4 is capable of calling a matching function 6. Matching function 6 may comprise software code capable of matching a profile 22 represented by data_2 with a cloud of points 20 represented by data_1, in function of various parameters, including init_data 24.

The matching process is performed by the software code in cooperation with processor 8, optionally with appropriate middleware in between. The result is stored as result_data 26 in memory 2.

Optionally, the post-processing unit 10 may process the result data 26, to adapt it for display on the graphic user interface 12. Various possible forms of data accessible from the graphic user interface 12 include a screen shot, a printed image, a list of parameters, a file, etc.

Figure 2:
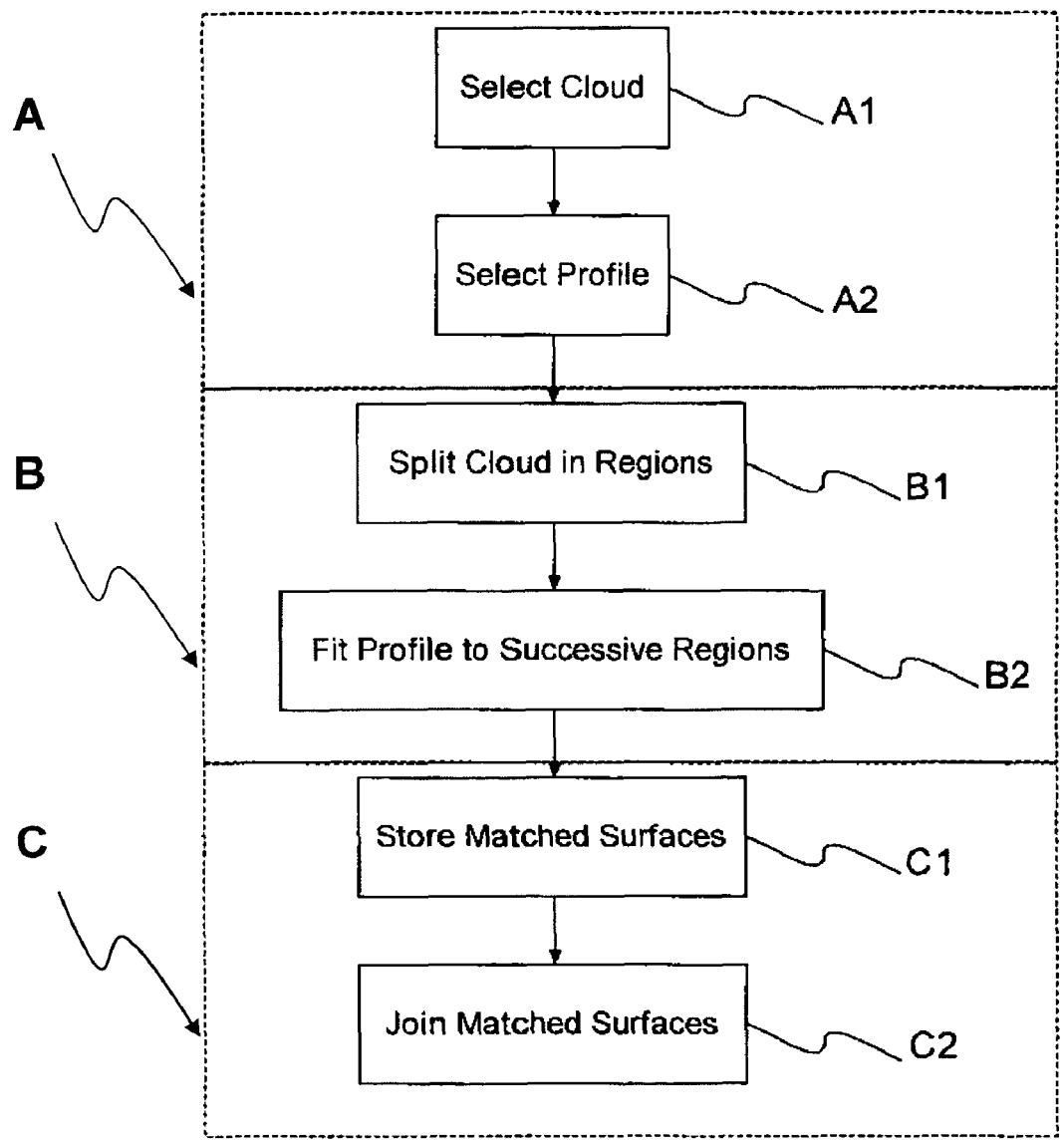
FIG. 2 shows an exemplary main flowchart of a method of processing image data.

FIG. 2 shows a flowchart of a method comprising three main blocks A, B and C. Those blocks can be selectively performed and/or iterated. This means that those blocks can be run a number of times, independently or in combination of each other.

Block A may be considered as a data preparation block comprising:

an operation A1 in which a cloud of points to be treated is selected, and an operation A2 in which a profile to interpret the cloud of operation A1 is selected.

Block B may be considered as a computing block comprising:

an operation B1, in which the cloud of operation A1 is divided in smaller clouds, also referred to as cloud regions or ranges, and an operation B2, in which the profile of operation A2 is fitted to the smaller clouds, within the respective regions of operation B1.

In the drawings, block B represents an iteration of operations B1 and B2. However, it would be possible to perform operation B1 alone several times in a row, and then to subsequently perform operation B2 on the various regions obtained from operation B1.

Figure 7:
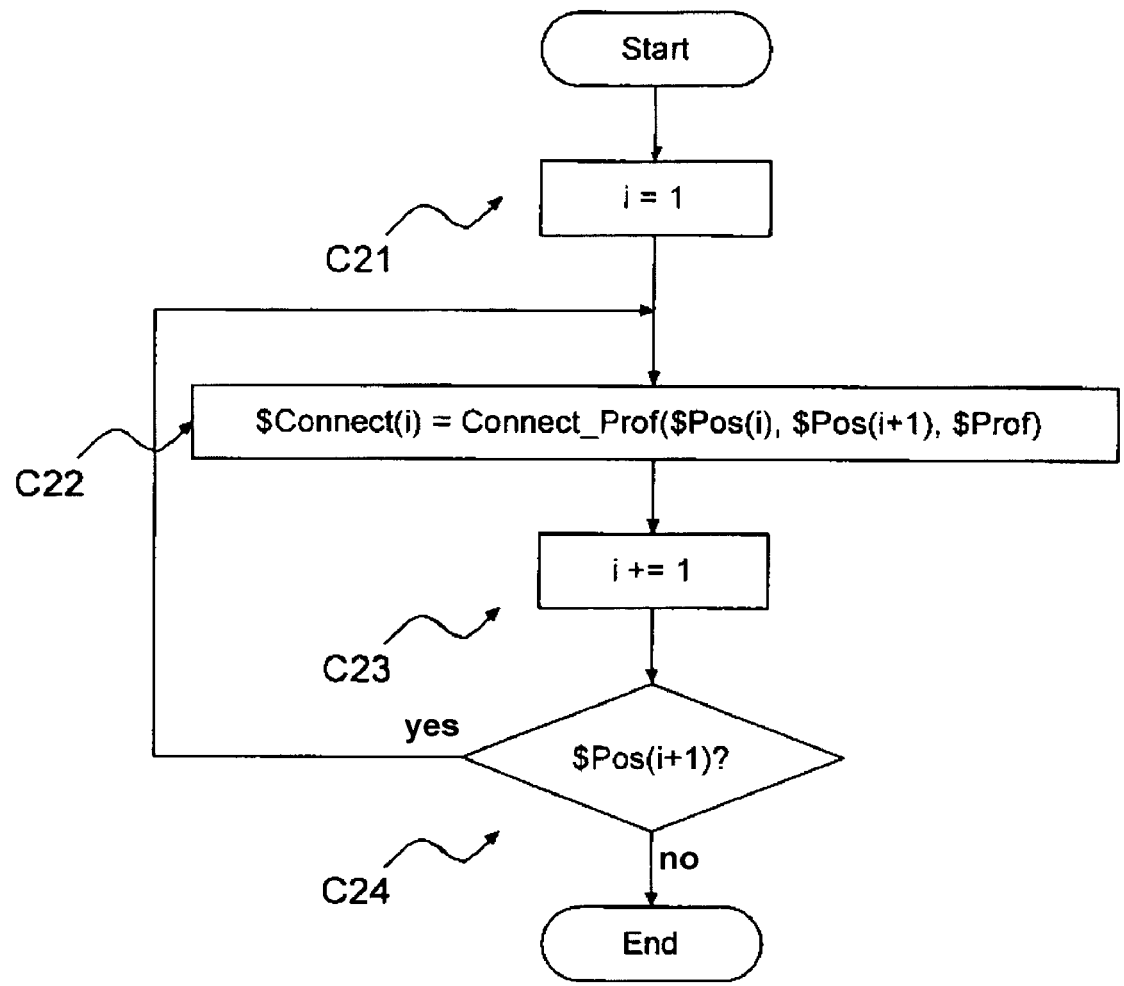
FIG. 7 details a part of the method of FIG. 2, in an example.

Block C can be considered as a post-processing block comprising:

an operation C1, in which the result of an iteration of operation B2 is stored in memory 2, and an operation C2, in which the data stored in operation C1 is used and completed with further data as described in FIG. 7.

In a particular embodiment described hereinafter, block A is performed, and block B and C are repeated one after another a number of times. Such an iteration can be very useful in that, in one iteration of blocks B and C, information from a previous iteration may be used to enhance the data processing.

Figure 3:
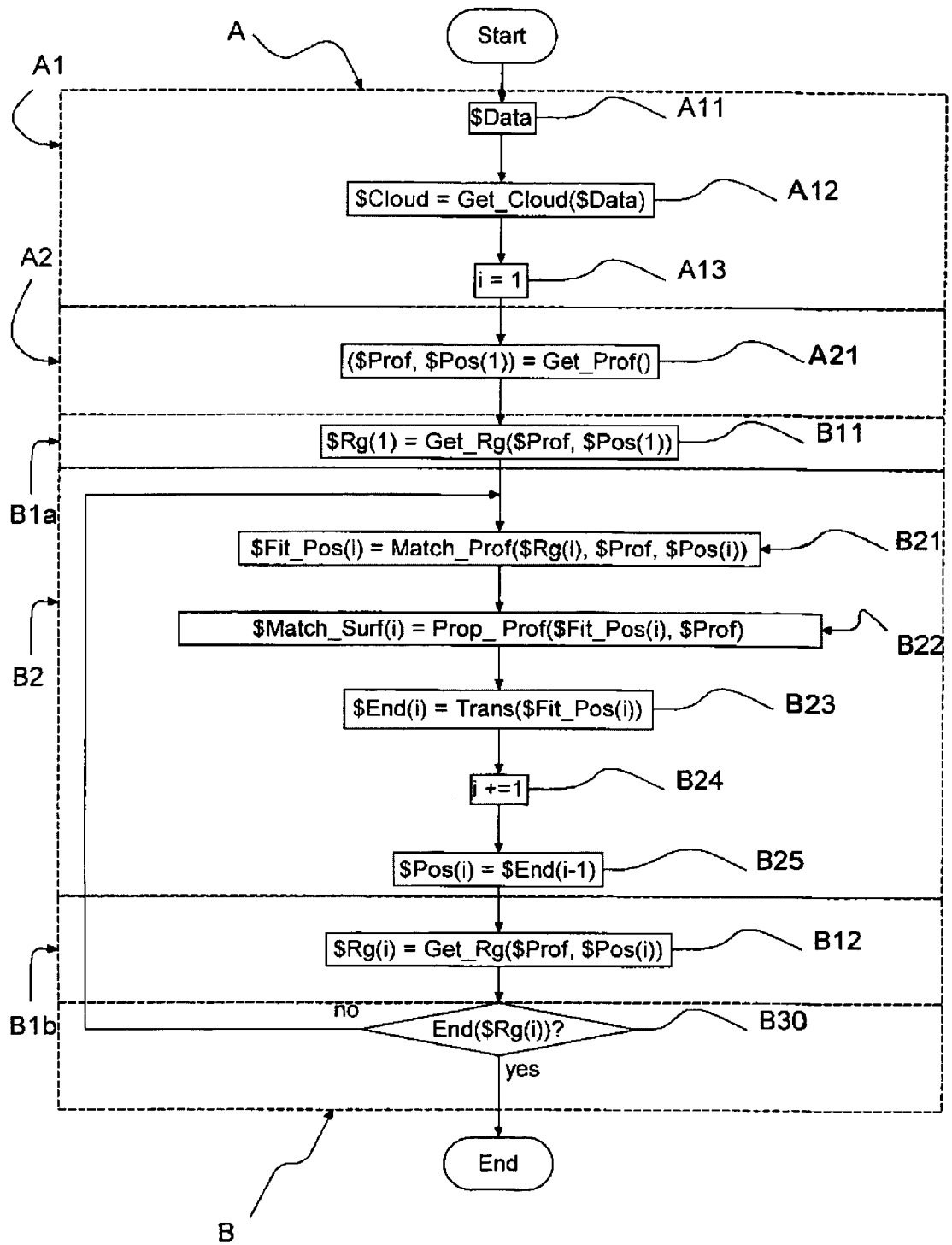
FIG. 3 shows an exemplary flowchart of the operations A1, A2, B1 and B2 shown in FIG. 2.

FIG. 3 shows in more detail an exemplary implementation of blocks A and B of FIG. 2.

In this example, operation A1 comprises sub-operations A11, A12 and A13. In more detail:

at operation A11, data $Data is selected, at operation A12, a subset or cloud of points $Cloud is defined, as represented by a function Get_Cloud( ), and at operation A13, an index i is initialized (i=1).

In this example, data $Data represents a large set of points in space, e.g. derived from the above cited data_1 present in a file. Also, operation A12 may be performed by displaying data $Data (or a portion of it) on a screen suitably connected to the image processing apparatus, and letting the user select the cloud $Cloud on screen.

Operation A2 comprises an operation A21 in which further data is obtained with a function Get_Prof( ). This data represents a selected profile $Prof as well as an initial position $Pos(1) of profile $Prof in cloud $Cloud.

In this example, the profile is assumed to be drawn by a user, with an adequate software tool, delivering corresponding profile design data $Prof. Further, the profile position in the cloud is also user defined, with an adequate software tool, delivering the corresponding initial profile position data $Pos(1). A number of tools exist for performing those actions.

Alternatively, $Prof and $Pos(1) may be roughly defined by the user; then, $Prof and/or $Pos(1) may be refined by local adjustment of the profile $Prof, positioned at $Pos(1), with regard to the cloud points existing in the vicinity of the profile as positioned. Still alternatively, $Prof and $Pos(1) might also be obtained from automatic analysis of a user designated portion of the cloud of points.

Figure 5A:
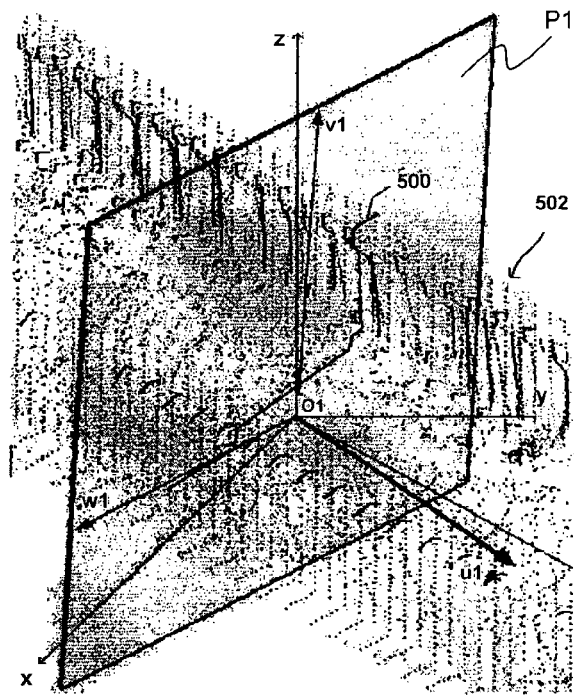
FIGS. 5*a*, 5*b*, 5*c*, and 5*d* show an example of parameters of use in FIG. 3

FIG. 5a shows a screen view of an exemplary cloud of points 502. It also shows a profile 500 in cloud of points 502. In this example, the profile is assumed to have been drawn by an operator.

Generally, the profile may be defined using:

a plane P1, or another 2D surface adapted to contain the profile, or a 2D curve in that plane or other 2D surface.

In the described embodiments, the 2D curve defining the profile is an assembly of elementary curves (profile elements), comprising segments, and circle arcs. Those profile elements can be defined by four parameters: two extremities, or "interest" points, a center and an angle (a segment would correspond to a 0° angle and an arc to the angle between the two extremities with respect to the center).

Curves of this type are very interesting in that they allow to build fast and accurate curves for most types of profiles, while their simple definition provide fast calculus abilities as will be seen thereafter.

However, many other types of curves may be considered to serve as profile elements, such as ellipse segments, NURBS (NonUniform Rational B-Splines), any kind of parametric curve and other generic curves.

A non planar 2D surface may be of interest if the curve of the profiles is non planar.

The plane P1 may be defined by an origin O1 and two vectors v1 and w1. In this example, all points and vectors are assumed to have Cartesian coordinates relative to a coordinate system (x, y, z). Alternatively, other coordinate systems may be used, subject to appropriate conversions therebetween.

As shown in FIG. 5a, a vector u1 forms a triplet (u1, v1, w1) together with aforesaid vectors v1, w1. This triplet may be seen as a local coordinate system, in the vicinity of profile position 500 in plane P1. Accordingly, plane P1 may alternatively be defined by its orthogonal vector u1 and origin O1.

Now, profile data (or data object) $Prof comprise parameters defining the shape or curve of profile 500. The nature of $Prof data will be further described in the following.

In the example, initial position $Pos(1) of profile 500 may be defined by a vector u1, origin O1 and an angle psi1 (FIG. 5b), i.e. in fact plane P1 and an orientation psi1 of the profile curve in plane P1. This is enough, to the extent origin O1 may be used as a reference point for positioning the shape of profile 500.

More generally, $Pos(1) may be defined by an alternative set of parameters, which together define the position in space of plane P1 and the position of profile 500 in plane P1.

Block B uses this data and comprises operations B1 and B2. Iterations will be made, with an index i representing the order of the current iteration. For ease in explanation, most of the variables changing in the iterations are assumed to be arrays based on index i, as shown in the drawings. In other words, index i is incremented at each iteration, and operation B1 and B2 are thus repeated until an adequate stop end-of-loop condition is met.

In FIG. 3, frame B1a contains the execution of an operation B11, with profile 500 being in its first position $Pos(1), i.e. $Pos(i) with i=1. It defines a first return $Rg(1), or $Rg(i) with i=1. This return is a region or range within the cloud of points $Cloud.

It will be appreciated that B1a is in fact the execution of a generic operation B12, with i=1. Software code for doing this may be generically defined as a function Get_Rg($Pos(i)), returning range or region data, which may have the form of a data object $Rg(i). Data object $Rg(i) may contain a set of points of the clouds. It may also be data defining a volume, designating points of the cloud contained in that volume.

$Prof is unchanged during these iterations, and may be seen as a global variable, or passed as an additional argument in function Get_Rg( ), as shown in the drawings for purpose of illustration. This also applies to other functions to be described hereinafter.

The region $Rg(1) may be associated to a volume contained between plane P1 and a parallel plane located at a selected distance from plane P1. Transversely, the region may be delimited by the outside contour of the cloud of points, or more restricted, if desired, e.g. based on the size of profile 500.

Figure 5C:
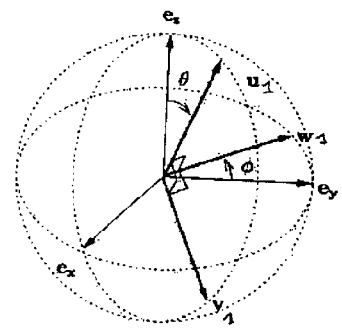
Figure 5B:
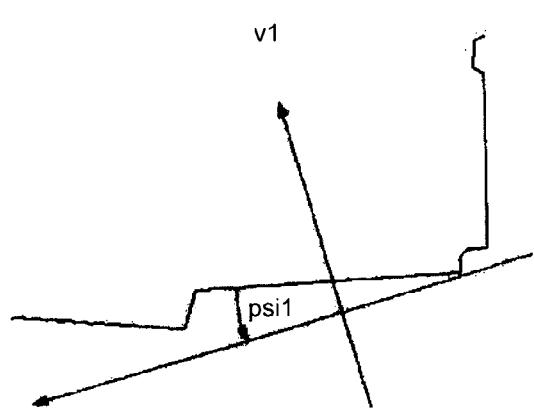
Figure 5D:
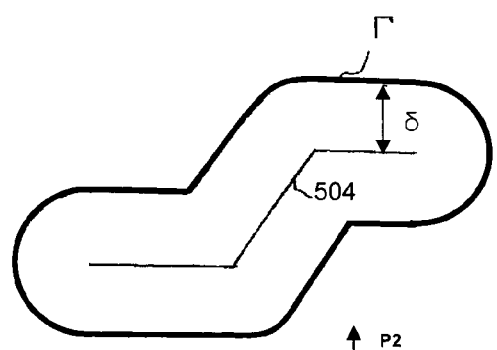

In a particular embodiment shown on FIG. 5d, in a plane P2, a curve Γ is defined as the set of points at a selected distance δ from a profile 504. Region $Rg(1) is then defined as the volume between plane P1 and a parallel plane located at a selected distance from plane P1, limited transversely by the orthogonal extraction of curve Γ.

After frame B1a, a loop of iteration is entered, with i=1.

For an i-th iteration, this loop operates as follows:

operation B2 is run on range $Rg(i), which is supposed to be available operation B1b is run using an argument resulting from operation B2, thus providing $Rg(i+1) for the (i+1)-th iteration of the loop, and operation B30 checks that the loop is supposed to go on, and will be described hereinafter.

Operation B2 is run on a range $Rg(i)$, and an initial position $Pos(i)$ and a profile $Prof are also supposed to be known. As seen above with the example of i=1, $Rg(i) is a set of points, $Prof is a curve, and $Pos(i) contains a vector ui, an origin Oi point and an angle psi_i (standing for ψi). Vector ui and origin Oi define a plane Pi, as determined from a preceding execution of the loop.

In an operation B21, a position $Fit_Pos(i) is derived from a function Match_Prof( ). The arguments of function Match_Prof( ) are range $Rg(i), a profile $Prof and a position $Pos(i).

Figure 4:
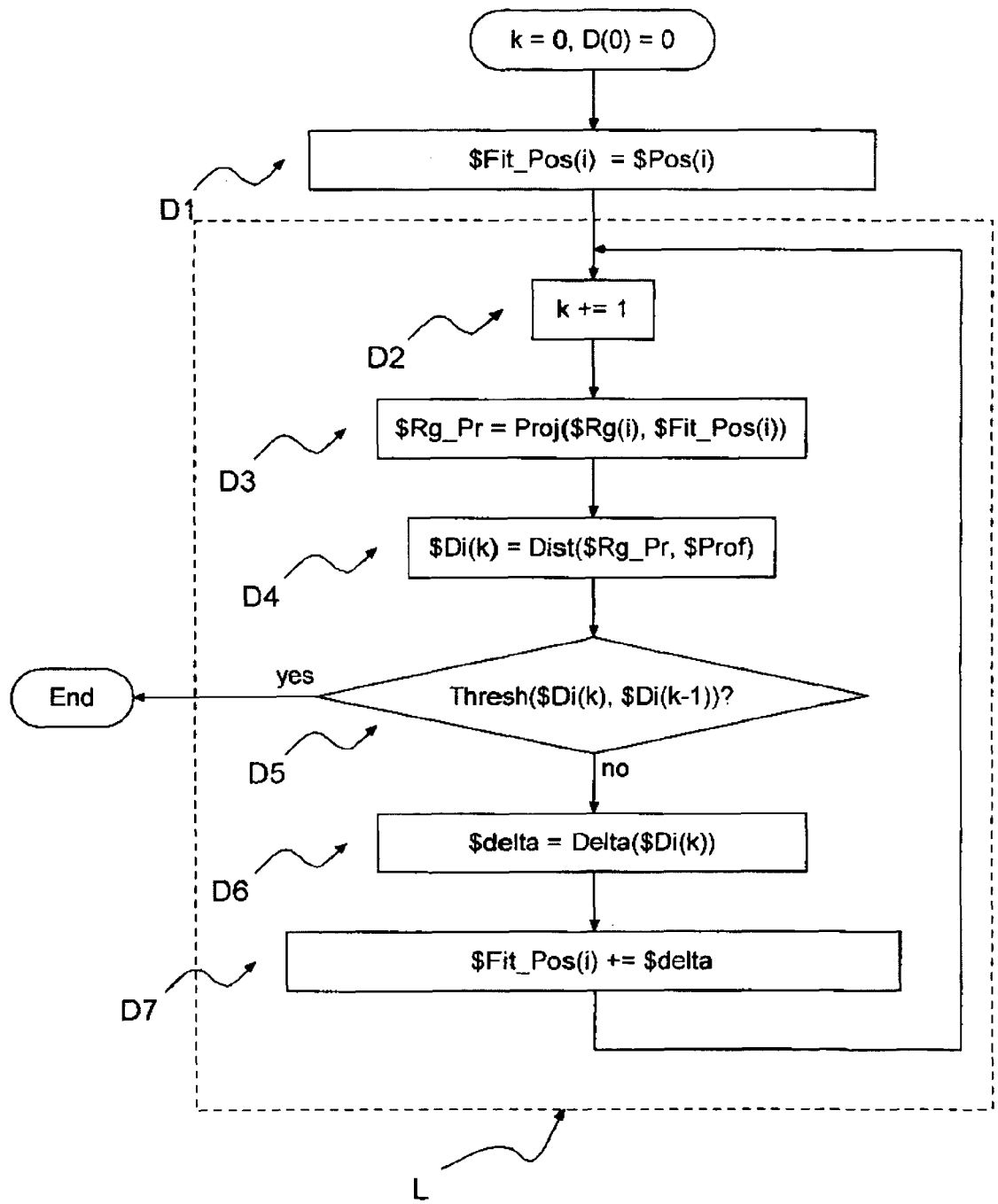
FIG. 4 shows an exemplary flow-chart of a function used in FIG. 3.

An exemplary detailed embodiment of function Match_Prof( ) is shown in FIG. 4. This function is used to fit a profile to a range. This function may be based on a loop L, in which a position $Fit_Pos(i) is going to be derived from $Pos(i).

First, in an operation D1, $Fit_Pos(i) is initialized with $Pos(i).

After that initialization, in the k-th iteration, loop L may have the operations D2, D3, D4, D5, D6 and/or D7.

In operation D2, index k is incremented.

In operation D3, points contained within range $Rg(i) are projected on plane Pi, as represented by a function Proj( ). In an embodiment of function Proj( ), every point in $Rg(i) defined by coordinates in (x, y, z), may be projected on plane Pi and be defined by coordinates in (ui, vi, wi). In a more specific embodiment, the projection may be performed with coordinates expressed as a function of three parameters θi, φi and psi_i (standing for Pi). The latter may be seen as spherical coordinates attached to coordinate system (ui, vi, wi). The result of function Proj( ) is thus a "projected" range $Rg_Pr comprising points relative to coordinate system (ui, vi, wi). In this embodiment, the data in $Fit_Pos(i) may be characterized by four parameters:

vector ui can be defined by two angles θi and φi, as shown on FIG. 5c, which represents a classical scheme showing the relations between Cartesian and spherical coordinates;

angle psi_i defines the position of the profile in plane Pi with regards to its origin Oi;

the coordinates of origin Oi.

In operation D4, a value $Di(k) is calculated by a function Dist( ). Function Dist( ) calculates the distance between the points of $Rg_Pr and the profile $Prof in plane P. This distance can bear many different definitions, since distances between points and curves within a plane is a known subject. In one embodiment, this distance may be defined as the sum of the squared distances between each projected point in $Rg_Pr and the curve in $Prof. The distance from a point to a curve is assumed to be taken along the line which is normal to the curve; where several normals may exist from a point to the curve, the closer distance is selected. Other definitions may also be contemplated in alternate embodiments, such as the sum of the absolute value of the distances. All of the points of $Rg_Pr are used to calculate this distance, including "singular" points that do not relate to the profile. However, the presence of the singular points is limited by the definition of $Rg(i), which solely includes points relatively close to the profile.

In operation D5, value $Di(k) is evaluated in a threshold function Thresh( ). Function Thresh( ) is a typical end loop function. Function Thresh( ) can be of many kinds, such as a simple comparison to a predetermined value or a comparison with values of $Di in a previous loop execution. In a particular embodiment, function Thresh( ) calculates the difference $\Delta Di=\$Di(k-1)-\$Di(k)$, and returns 1 if $\Delta Di$ is superior to $\gamma*\$Di(1)$, where $\gamma$ is a fixed value. Else, Thresh( ) returns 0. Other thresholds may be used, such as a fixed threshold for $Di(k) or another derivative value of $Di(k) that can be inferred from previous runs of loop L.

In operation D6, if the threshold is not crossed, a derivative value $delta is calculated from value $Di(k). This may be seen as a function Delta( ), which calculates derivatives $delta_θ, $delta_φ and $delta_psi, that will adjust the parameters in position $Fit_Pos(i) so that $Di(k+1) is minimized.

In operation D7, $delta is added to $Fit_Pos(i).

The loop L may be repeated until function Thresh( ) returns a value crossing the threshold, which will stop the loop L, thus defining $Fit_Pos(i), the loop of block B thus continuing.

In aforesaid operation B22, a function Prop_Prof( ) determines a matched surface $Match_Surf(i) from the fitting position $Fit_Pos(i) and the profile $Prof. Practically, a surface is extracted from profile $Prof from the origin Oi and angle ps_i and along the direction of vector ui in fitting position $Fit_Pos(i). The length of the extraction is that of range $Rg(i).

In operation B23, a function Trans( ) "translates" fitting position $Fit_Pos(i). The result may be an ending position $End(i). In one embodiment, ending position $End(i) may correspond to $Fit_Pos(i), except that its origin has been translated to an "end" of the matched surface $Match_Surf(i). In other words, origin Oi of fitting position $Fit_Pos(i) has been translated by a vector parallel to vector ui and having the length of the matched surface $Match_Surf(i).

In operation B24, index i may be incremented, and in operation B25, $Pos(i) may be initiated with the ending position $End(i) just calculated in operation B23. This change in $Pos(i) prepares the next iteration of the loop in which operation B2 is executed. Thus, the loop may build matched surfaces one by one, the ending position of a given matched surface being the initial position of the following one (or of a following one, e.g. if the loop is "shared" for different processing).

After a range $Rg(i) has been calculated, an end loop function End( ) may be run in operation B30. This function may use various conditions to decide whether the loop continues or ends, e.g. one or more of the following conditions:

check whether there are enough points in range $Rg(i) to continue with a new iteration of the loop;

use a quality-related value, expressing the precision of the matching performed in the previous loop execution, or several of them. If the quality is too low, function End( ) may end the loop. In a particular embodiment, such a quality-related value may use statistics established in previous imaging of scenes.

Figure 6:
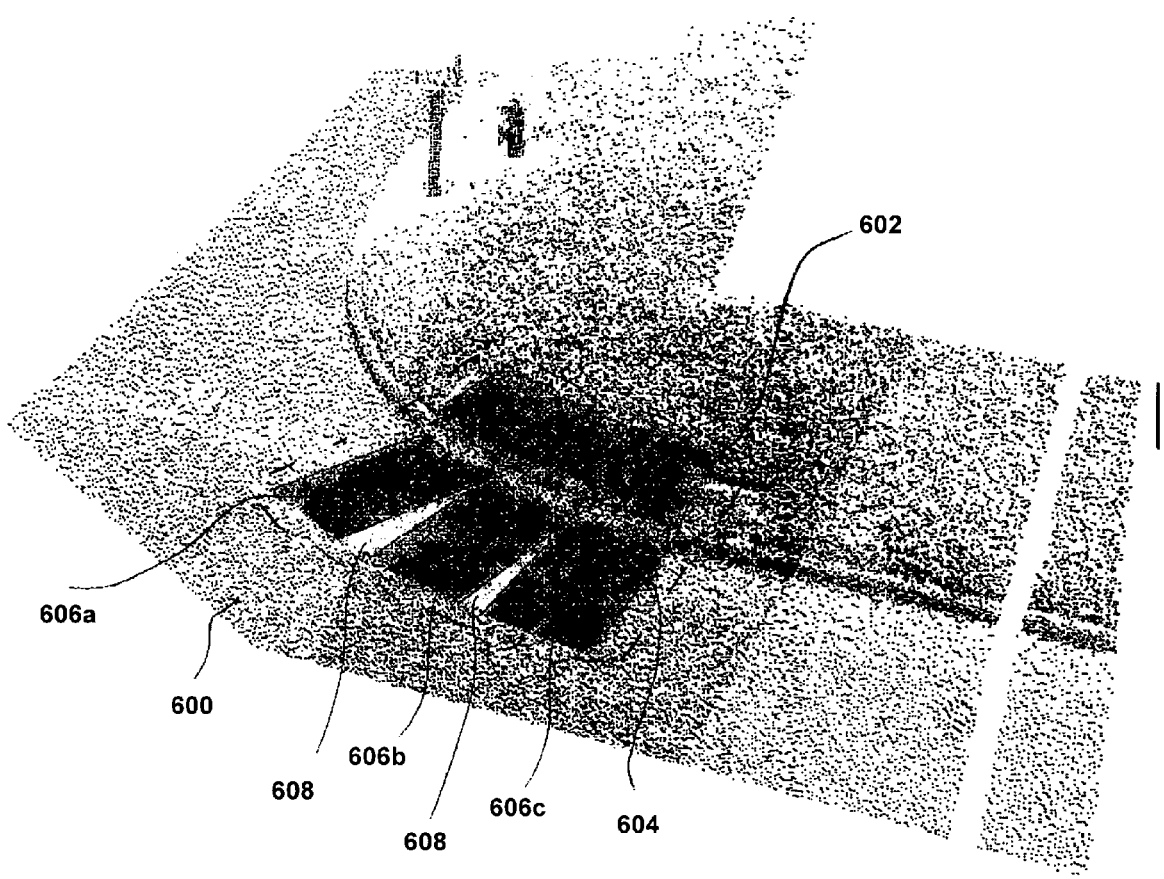
FIG. 6 shows an example of an output of the method of FIG. 3.

FIG. 6 shows an example of an output of the blocks A and B. The basis is a cloud of points 600, which is an instance of the cloud 502 of FIG. 5a. Cloud 600 contains a walkway.

In this cloud 600, a region 602 has been selected, and the operations of blocks A and B have been performed with a profile 604. The result is three surfaces 606a, 606b and 606c, which closely match the walkway.

However, gaps 608 remain between the matched surfaces. Gaps 608 originate from the fact that block B does not accommodate continuity when there is a change of direction in the profile fitting.

Figure 8:
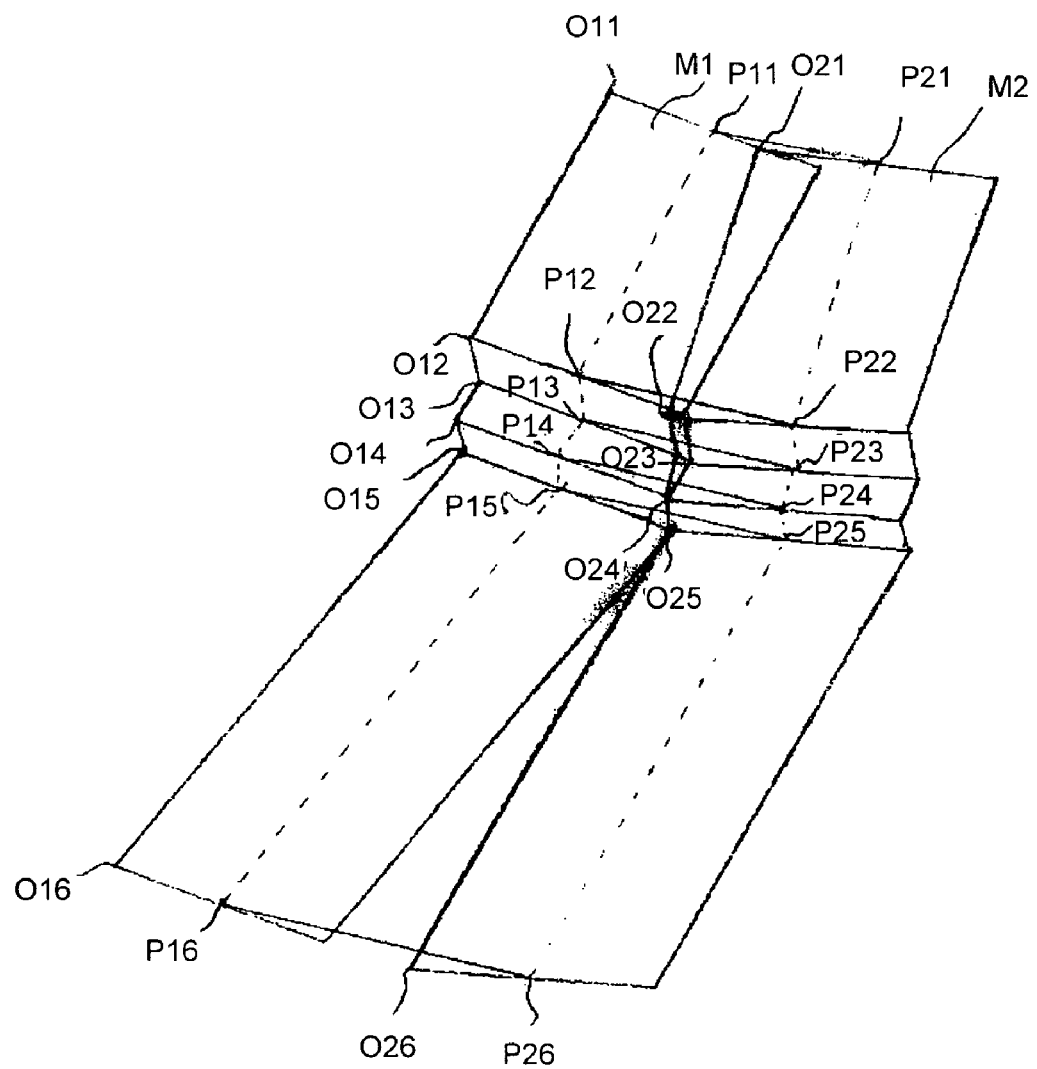
FIG. 8 shows an example of an output of the method of FIG. 7.

This continuity is assured in block C of FIG. 2, an exemplary output of which can be seen on FIG. 8. More precisely, the accommodating is taken care of in operation C2 of FIG. 2, as detailed on FIG. 7. In this embodiment, block C is performed alternately with block B, meaning that a matched surface is connected to the previous one immediately after having been created. However, it is conceivable to have block C performed on the whole of the matched surfaces.

Operation C2, here comprising sub-operations C21, C22, C23, and/or C24, will connect successive matched surfaces.

In operation C21, an index i is initiated. In operation C22, a connecting function Connect_Prof( ) creates a three-dimensional curve $Connect(i) that represents consecutive matched surfaces.

In an embodiment, the curve is defined by a set of segments connecting "interest" positions of the respective matched surfaces. Those interest positions can correspond to the translation in the middle of each matched surface of each of the interest points of the elementary profiles constituting the profile.

Technically, for each matched surface, the interest points of the profile are translated from the initial position $Pos(i) by a function similar to the function Trans( ), except that the length of the translation is only half that of the matched surface.

Corresponding interest positions belonging to consecutive matched surfaces are then joined by straight lines, and a series of connecting segments are obtained. The curve $Connect(i) is delimited by two planes containing the above described interest positions of each matched surface and the series of segments.

In this embodiment, the matched surfaces need not be defined further than by their originating parameters, since the curve $Connect(i) only needs the interest points of the profile and two initial positions to be defined.

Other approaches may be used, notably to smooth matched surfaces. For instance, conventional smoothing functions maybe used, which mix the coordinates of points belonging to respective ends of consecutive matched surfaces to create a joining surface.

The index i is incremented in operation C23, and in operation C24 a check is performed to see whether there is a matched surface left to join.

FIG. 8 shows an exemplary output of operation C2. Two matched surfaces M1 and M2, which correspond to the two surfaces 606a and 606b of FIG. 6.

Six interest points O11, O12, O13, O14, O15 and O16 of surface M1 are shown, as well as six interest points O21, O22, O23, O24, O25 and O26 of surface M2. The result of operation C2 is interest positions P11, P12, P13, P14, P15 and P16 of surface M1, and respectively, P21, P22, P23, P24, P25 and P26 of surface M2. The interest positions from each surface (P11-P21, P12-P22, P13-P23, P14-P24, P15-P25 and P16-P26) are joined by a straight line to constitute the above mentioned three-dimensional curve.

Figure 9:
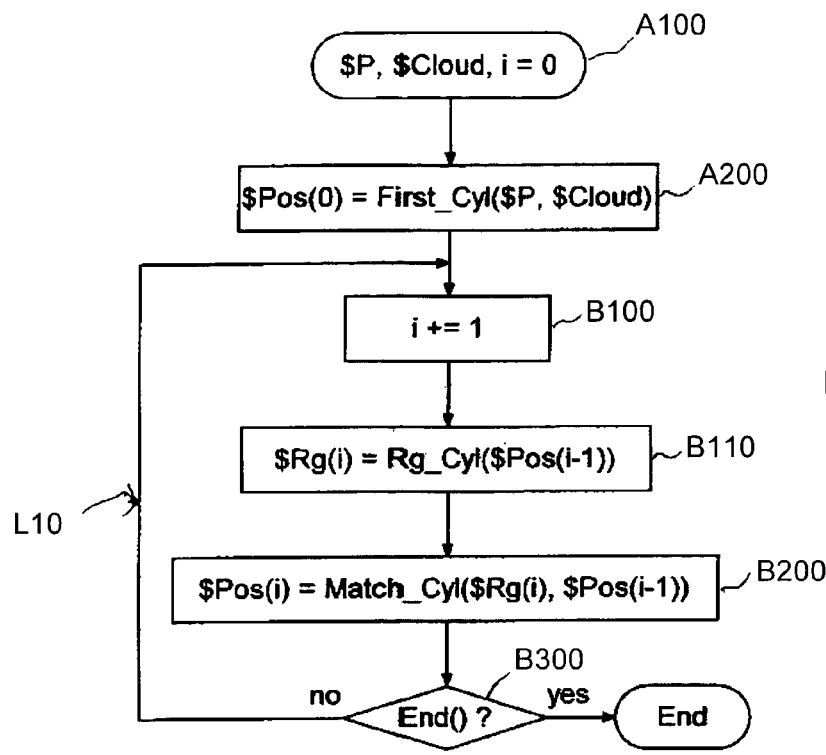
FIG. 9 shows an exemplary flowchart of the operations A1, A2, B1 and B2 shown in FIG. 2, in a particular embodiment.
Figure 10:
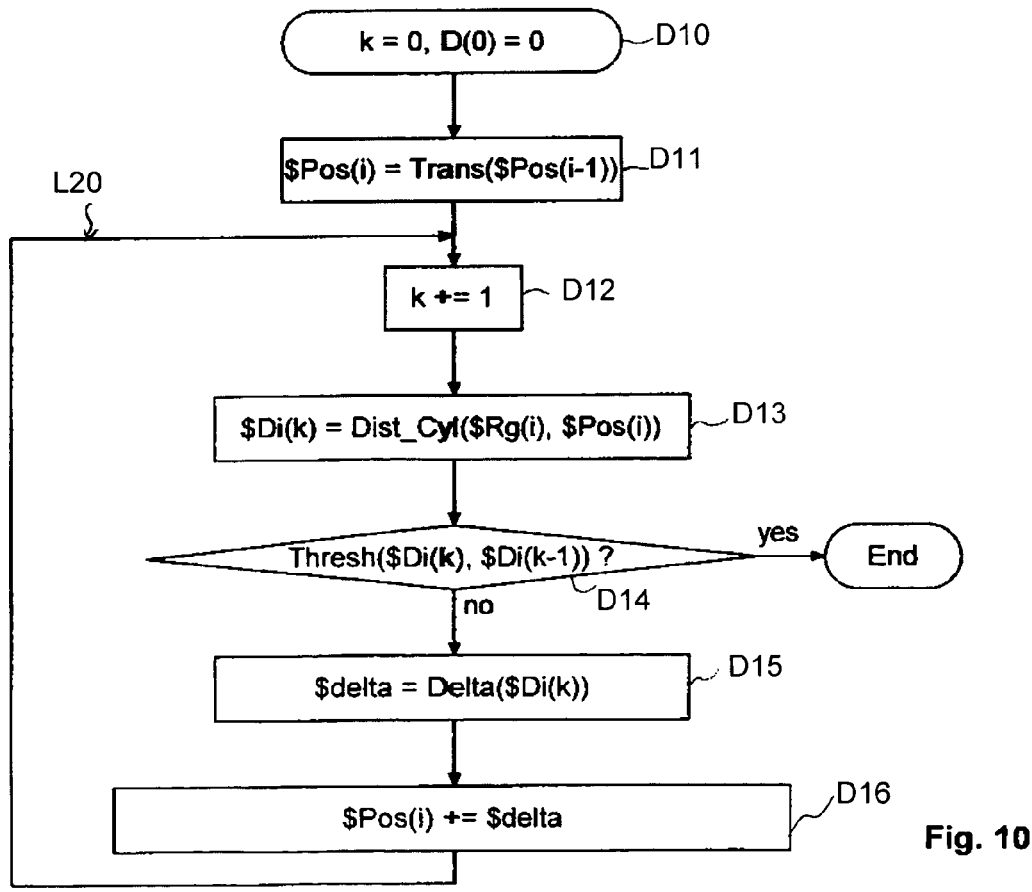
FIG. 10 shows an exemplary flow-chart of a function used in FIG. 9.
Figure 11:
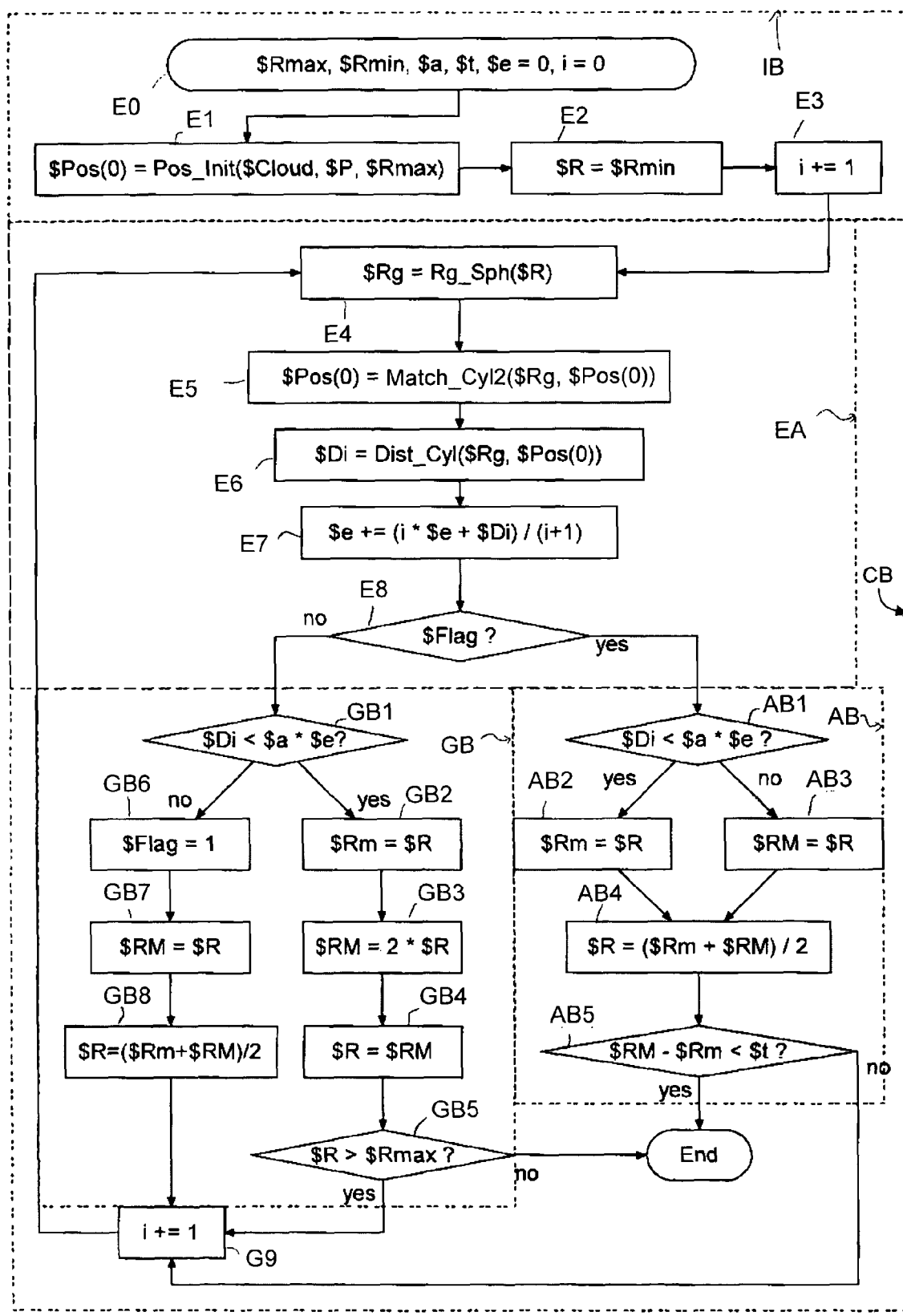
FIG. 11 shows an exemplary flow-chart of another function used in FIG. 9.

In another embodiment, the cloud of points used for imaging represents a scene composed of cylinders. FIGS. 9, 10 and 11 show several flowcharts representing exemplary embodiment of blocks A and B which are designed specifically for cylinder-based scenes.

In this embodiment, the positions and ranges described earlier are still used. However, due to the particularities of cylinders, the position data generally referred to as $Pos(i) may be restricted to a point, an orthogonal vector and a radius. The data defining the profile $Prof is not useful in this embodiment, since a point, an orthogonal vector and a radius are the only necessary parameters to define a cylinder.

In an equivalent manner, a cylinder may be defined by using only two of the three angles (θ and φ instead of θ, φ and psi), plus a point and a radius.

On FIG. 9, block A comprises an operation A100 in which a cloud $Cloud and a point $P of cloud $Cloud are selected.

In an operation A200, an initial position $Pos(0) is defined as the result of a function First_Cyl/, which takes point $P and cloud $Cloud as arguments. Function First_Cyl( ) will be described hereinafter with FIG. 11.

A loop L10 is then performed, which may comprise the operations B100, B110, B200 and/or B300 in the i-th iteration.

In operation B100, index i is incremented.

In operation B110, a range $Rg(i) is the result of a function Rg_Cyl( ), which takes $Pos(i−1) as an argument. Function Rg_Cyl( ) first translates a position $Pos(i−1) as described above in function Trans 0. The range $Rg(i) is then defined as the points of cloud $Cloud in a half-sphere whose center is defined by the position resulting from Trans($Pos (i−1)). The half-sphere is defined by a normal vector opposite to that of $Pos(i−1), and the radius is sqrt(2) that of $Pos(i−1).

In operation B200, a position $Pos (i) is defined as the result of a function Match_Cyl( ), which is very similar to function Match_Prof( ). Function Match_Cyl( ) uses $Rg(i) and $Pos(i−1) as arguments and will be described hereinafter.

In operation B300, the function End( ) is used as an end-loop condition.

It is to be noted that the radius of the cylinder being fitted here is constant. If the scene being imaged comprises smaller or bigger cylinders, the matching is unsuccessful when the radius changes. Another point must then be selected to further image the scene.

As mentioned above, function Match_Cyl( ) is similar in principle to function Match_Prof( ) described above. A difference is that in function Match_Cyl( ), the parameters in variable $Pos(i) are not the same as in function Match_Prof( ).

It is to be noted that only the vector in $Pos(i) is actually adjusted. The point in $Pos(i) is a simple translation of the point of the previous position $Pos(i−1) and thus could be derived from the previous positions, and the radius is a constant as mentioned above. FIG. 10 shows a flowchart of function Match_Cyl( ).

This function comprises two initialization operations D10 in which first values are set to 0, and D11 in which the position $Pos(i) is first initiated with the position Trans($Pos(i−1)).

A loop L20 is then executed, which may comprise the operations D12, D13, D14, D15, and/or D16, in the k-th iteration:

In operation D12, index k is incremented.

In operation D13, a function Dist_Cyl( ) which takes range $Rg(i) and position $Pos(i) as arguments is used to calculate a distance $Di(k). Function Dist_Cyl( ) is extremely similar to function Dist( ). It only differs in that it directly calculates the distance from the points in $Rg(i) to the cylinder defined by the parameters in position $Pos(i), without projecting the points on a plane (compare with operations D3 and D4, FIG. 4).

In operation D14, an end-loop condition which uses the same threshold function Thresh( ) as function Match_Prof( ).

Operation D15 is equivalent to operation D6, see FIG. 4.

Operation D16 is equivalent to operation D7, see FIG. 4.

FIG. 11 shows a flow-chart of function First_Cyl( ). This function is extremely important because it determines the initial position $Pos(0) which contains the radius that will not change during the whole process described above.

Function First_Cyl( ) is a function which comprises an initialization block IB and a computing block CB.

After getting parameters in an operation E0, the block IB may comprise the operations E1, E2, and/or E3.

In operation E1, first initial position $Pos(0) is defined as the result of a function Pos_Init( ). Function Pos_Init( ) uses cloud $Cloud, point $P and a maximum radius $Rmax as arguments. It selects a number $Rmax of points of cloud $Cloud that are closest to point $P, uses the gaussian image of those points to determine a first origin, vector and radius for $Pos(0).

In operation E2, a variable radius $R is initialized with a value $Rmin.

In operation E3, an index i is incremented.

The block CB is a loop which comprises an error assessment block EA followed by two branches which are executed depending on a flag.

The block EA may comprise the operations E4, E5, E6, E7, and/or E8.

In operation E4, a range $Rg is defined as the result of a function Rg_Sph( ). This function selects the number $R points of cloud $Cloud which are closest to point $P.

In operation E5, position $Pos(0) is set as the result of Match_Cyl2($Rg, $Pos(0)). Function Match_Cyl2( ) is different from function Match_Cyl( ) described above in that the radius of $Pos(0) is not fixed. Also, the point of $Pos(0) is not derived from another point: it is calculated dynamically along with the vector and the radius of $Pos(0).

In operation E6, value $Di is defined as the result of Dist_Cyl($Rg, $Pos(0)). This gives the adjustment error for this particular range.

In operation E7, an error $e is calculated. It represents a marginal progress of error $e with regards to the previous iteration of the loop.

In operation E8, the presence of the flag is checked and it directs the current iteration towards a growing branch GB or an adjustment branch AB.

The flag is set only if a test in the branch GB is false. So until said test is false, the iteration goes through the growing branch.

In operation GB1, value $Di is compared to error $e times a constant $a. This test determines whether the growing phase is over and if the flag should be set. If $Di<$a*$e, the growing goes on, and branch GB may comprise operations GB2, GB3, GB4 and/or GB5.

In operation GB2, variable minimum radius $Rm is set equal to variable radius $R.

In operation, GB3, variable maximum radius $RM is set equal to two times the variable radius $R.

In operation GB4, variable radius is multiplied by 2 ($R=$RM).

In operation GB5, a test is performed to check whether variable radius $R is over a preset maximum radius $Rmax. If so, the computing block is over and $Pos(0) is returned.

If the test is false, the adjustment is prepared, and branch GB may comprise the operations GB6, GB7, and/or GB8.

In operation GB6, the flag $Flag is set to 1.

In operation GB7, variable maximum radius $RM is set equal to the variable radius $R.

In operation GB8, variable radius is reduced with the formula $R=($Rm+$RM)/2.

After either of these branches, index i is incremented in operation E9.

After the flag has been set in one iteration, the adjustment branch AB is performed in the following iterations, which may comprise the operations AB1, AB2, AB3, AB4 and/or AB5.

In operation AB1, value $Di is compared to error $e times a constant $a. This test determines how the adjustment will be performed.

Operation AB2 is executed if $Di<$a*$e, in which variable minimum radius $Rm is set equal to the variable radius $R, otherwise operation AB3 is executed, in which variable maximum radius $RM is set equal to variable radius $R.

In operation AB4, variable radius is then updated with the formula $R=($Rm+$RM)/2.

In operation AB5, the difference $RM−$Rm is compared to a value $t to check whether the adjustment is precise enough. If so the computing block ends. Otherwise, operation E9 is performed.

Those skilled in the art will recognize that the computing block is divided. The number of points taken into account is grown by factors of 2 in a first phase, and as soon as an excessive error is detected, the number of points is reduced to find the best approximation.

The result is a fast and accurate position $Pos(0). Other methods and function may be employed to determine the parameters of $Pos(0), such as manual determination or other analytical and/or geometrical methods.

After the operations of FIG. 9 have been performed, a series of cylinders defined by positions $Pos(i) are available, as well as matching ranges $Rg(i). However, those cylinders are not generally joined and they do not constitute a unitary cylindrical structure.

Figure 12:
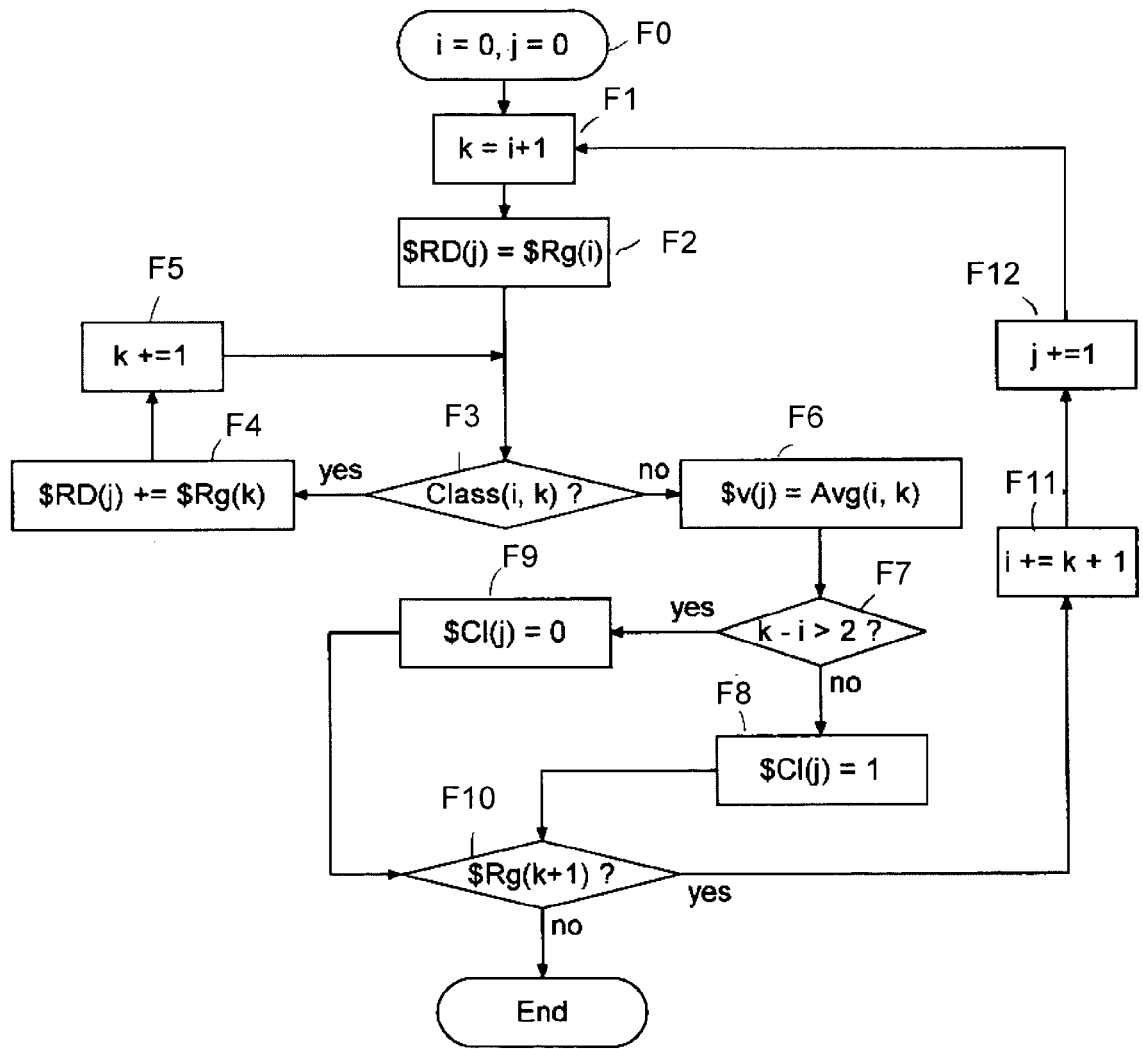
FIG. 12 shows an exemplary flowchart detailing part of the method of FIG. 2, in the embodiment of FIG. 9.
Figure 13:
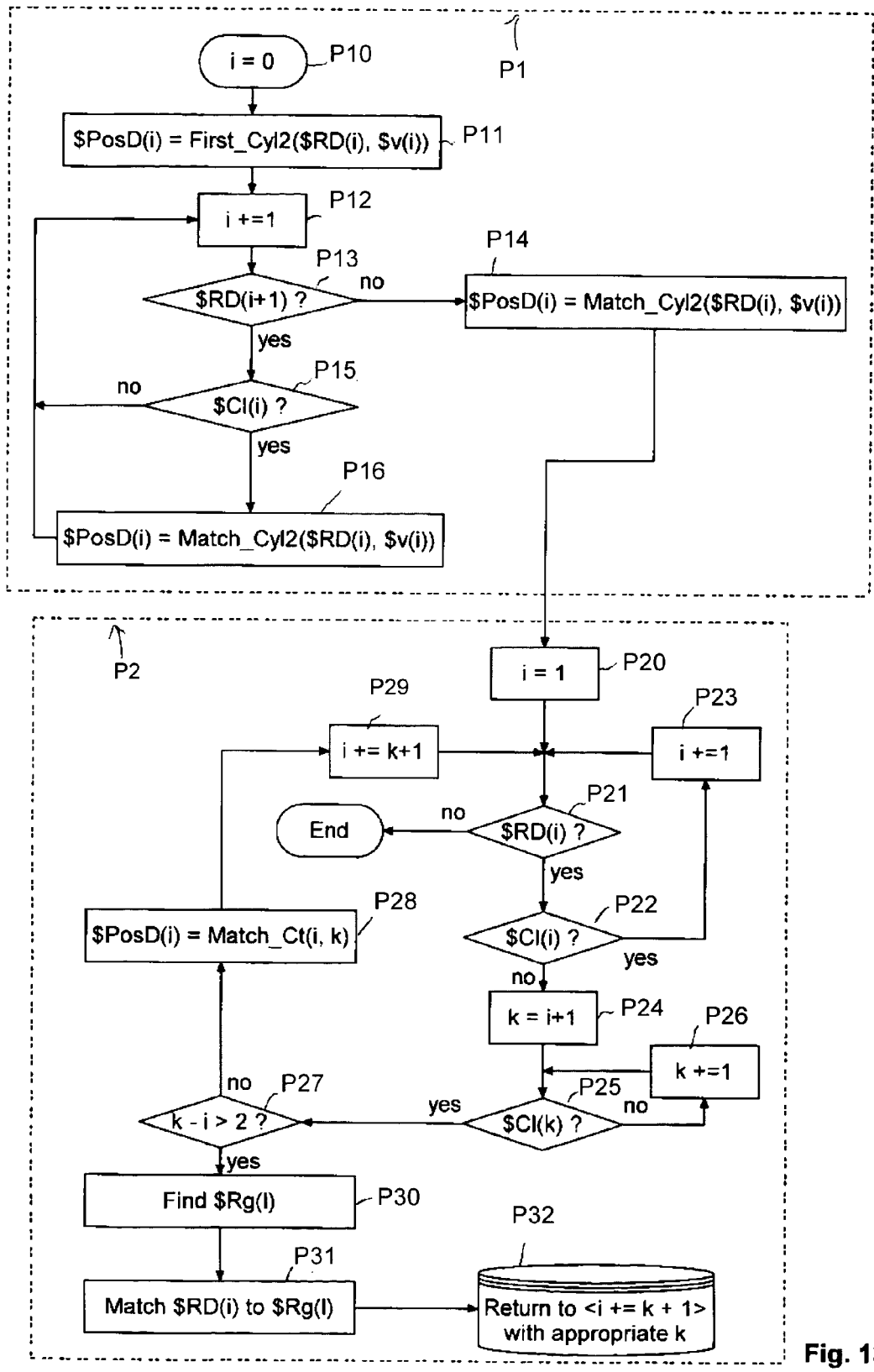
FIG. 13 further details part of the method of FIG. 2, following FIG. 12.

In one embodiment, the cylinders defined by positions $Pos(i) and the matching ranges $Rg(i) are used to perform a further matching step which offers a unitary cylindrical structure, as shown on FIGS. 12 and 13.

This further matching operation comprises classifying the respective ranges in distinctive classes in a first step, and selectively fitting those classified ranges in a second step.

The classifying step is shown in FIG. 12. Two indices i and j are set at 0 in an operation F0, and a loop is executed, which may comprise the operations F1, F2, F3, F4, F5, F6, F7, F8, F9, F10, F11, and/or F12.

In operation F1, an index k is set at value i+1.

In operation F2, a range $RD(j) receives the range $Rg(i).

In operation F3, a class function Class( ) compares the vectors in $Pos(i) and $Pos(k). If those vectors are similar enough, e.g. their scalar product is close to 1, function Class( ) returns a positive value.

When Class( ) returns a positive value, operations F4 and F5 are performed.

In operation F4, range $RD(j) receives range $Rg(k).

In operation F5, index k is incremented.

However, as soon as function Class( ) returns a negative value, operations F6 and F7 are performed.

In operation F6, a vector $v(j) is set as the result of a function Avg( ), which takes indices i and k as arguments and returns a vector corresponding to the average of the vectors contained in every position between $Pos(i) and $Pos(k).

In operation F7, the difference between k and i is compared to 2. If yes, then operation F8 is performed in which class $Cl(j) is set to 1, and if no, then operation F9 is performed in which class $Cl(j) is set to 0.

In operation F10, a check is performed to see whether all the ranges have been analyzed. If so, then it is the end of this function, otherwise in operation F11, index i is incremented by k+1 and, in operation F12, index j is incremented and the loop reiterates with operation F1.

The function described above groups all consecutive ranges which are considered to represent cylinders that extend in the same direction.

For modeling purposes, further explained with FIG. 13, they are being given a class $Cl which will be further explained hereinafter.

FIG. 13 shows a modeling process performed after the ranges have been classified. This function comprises two main passes:

in a first pass, the classified ranges $RD which are of class 1 are matched and modeled with the classified ranges, and in a second pass, the remaining classified ranges are also matched and modeled, but according to a different method.

As shown on FIG. 13, two blocks P1 and P2 represent those two passes. Block P1 may comprise the operations P10, P11, P12, P13, P14, P15 and/or P16.

In operation P10, an index i is set with value 0.

In operation P11, a first range $RD(0) is matched with a function First_Cyl2( ). This function uses a range and a vector as arguments and returns a position. The result is a position $PosD(0). Function First_Cyl2( ) is similar to function First_Cyl( ), except that it uses different arguments.

A loop is then initiated, which matches and models only those of the classified ranges which are of class 1, and which may comprise the operations P12, P13, P15 and/or P16 in the i-th iteration.

In operation P12, index i is incremented.

In operation P13, a check is made to see whether all ranges $RD( ) have been processed. If yes, the loop is exited, and block P1 is ended with operation P14, in which the last range $RD(i) is matched and modeled before the second pass. If no, operation P15 is performed.

In operation P15, a test checks whether class $Cl(i) of range $RD(i) is 0 or 1. If the class $Cl(i) is 1, then operation P16 is performed in which position $PosD(i) is set as the result of function Match_Cyl2($RD(i), $v(i)), and the loop reiterates with operation P12. Otherwise, the loop is directly reiterated with operation P12.

After operation P14, block P1 is ended, and block P2 is started. Block P2 is another loop, in which classified ranges of class 0 are matched and modeled in a simpler way, using the already matched ranges. The general idea of this loop is to systematically locate a range of class 0 between two already matched ranges, and to use those as constraining conditions.

After index i is reset to 1 in operation P20, a loop is entered, which may comprise the operations P21, P22, P23, P24, P25, P27, P28, and/or P29 in the i-th iteration.

In operation P21, a check is made to see whether all ranges $RD(i) have been processed. If yes, the loop is exited, and block P2 is ended, otherwise in operation P22, class $Cl(i) is checked to find the first range after index i that is of class 0. While Cl(i)=1, i is incremented in operation P23.

In operation P24, an index k is set at value i+1.

In operation P25, class Cl(k) is checked to find the first range after index k that is of class 1. While Cl(k)=1, k is incremented in operation P26.

In operation P27, the difference k−i is compared to 2 to check that range $RD(i) of class 0 is between two ranges $RD(i−1) and $RD(i+1) of class 1.

In most of the cases, this test returns a positive value, and in operation P28, $PosD(i) is set as the result of a function Match_Ct( ). Function Match_Ct( ) takes index i as an argument and a returns the cylinder that joins $PosD(i−1) and $PosD(i+1). Then in operation P29, index i is incremented to i+2 (or i+=k+2), and the loop starts over with operation P21.

However, in a limited amount of cases, operation P27 returns a negative value. Then, a variety of solutions may be contemplated, one of which may comprise the operations P30, P31, and/or P32.

Operation P30 uses a function which takes i and k as indices analyzes all the vectors contained in the positions $Pos(j) associated to the ranges $Rg(j) which are contained in classified ranges $RD(i) to $RD(k). Those vectors may then be fitted to a circle, and the first range $Rg(l) whose vector does not fit the circle is considered of class 1.

Operation P31 matches the ranges between $RD(i) and $Rg(l).

Then, operation P32 returns to operation P29, with an appropriate index k.

Function Match_Ct( ) is a function which matches a range included between two previously matched class 1 ranges, with the constraint that the matching must end at the respective extremities of those ranges. Function Match_Ct( ) may be implemented in a way that, instead of matching a straight cylinder, it matches a torus portion.

A torus portion is defined to be tangential to both the cylinders located before and after it. The position in space of both these cylinders is fixed at this point, but their extremities are not. The two cylinders have secant axes and a common radius. Hence the only parameter that needs to be estimated is the major radius of the torus portion; the minor radius being the radius of the cylinders.

In order to do so, a matching (or 'fitting') function is used, which uses a minimization technique to infer the best parameter from the points in the range. The exact extremities of the torus and of the two cylinders are then inferred from the estimated radius of the torus portion. As a result, the first cylinder is tangentially connected to the torus portion, which is tangentially connected to the second cylinder.

The examples described herein are to be interpreted in a non restrictive manner, and the scope of the invention encompasses all alternatives accessible to those skilled in the art.

For example, some data have been described as being acquired on the screen from the user, such as the originating point and the profile. The profile could be obtained automatically, through the analysis of a portion of the cloud. The originating position could be set at an extremity of the cloud. In the case the originating position does not correspond to an extremity of the part of the scene being matched, the matching could be conducted on both sides of the starting position, by initially using two opposite vectors u for instance.

It will be appreciated that FIG. 2 shows a general flowchart, while FIG. 3 is a more specific exemplary embodiment, in which the ranges are defined and processed sequentially.

A variety of alternative embodiments may be contemplated.

While it is convenient that each range be defined from the immediately preceding one, it may be defined from a preceding one, e.g. where several "paths" in the cloud of points would be processed in parallel. This encompasses the case when the matching is conducted on both sides of the starting position.

It is also possible, at least in certain situations, to separate the determination of the direction of matching from the matching operation itself; accordingly, the determination of the ranges might be entirely done before the matching itself, as shown in FIG. 2.

Other alternatives are possible, more or less mixing the above possibilities, e.g. immediately determining the relatively straight portions of matching, while subsequently determining more curved portions.

The above described method is implemented by software code. Controller and matching function in the above described example comprise software code. However, they could also be implemented in whole or in part as on-board circuitry.

This invention also covers the corresponding software code itself, especially when made available on any appropriate computer-readable medium. The expression "computer-readable medium" includes a storage medium such as magnetic or optic, as well as a transmission medium such as a digital or analog signal. In the present case, the software code may basically include the "matching function", and/or the "controller", as well as code adapted to perform the same functions, while relying on appropriate middleware.

What is claimed is:

1. A method of processing image data, comprising the steps of:
storing a three-dimensional cloud of points related to a scene;
selecting a profile definable in a two-dimensional surface; and
matching said profile with said cloud of points, within a plurality of regions thereof, thus obtaining a plurality of sets of data representing successive matched surface portions, wherein the matching step further comprises the steps of:
defining a starting position of the profile in said cloud, and a range in the cloud, said range being adjacent to said starting position, and extending along a direction of extension away from said two-dimensional surface;
determining a direction of matching, along which said profile substantially fits with cloud points within said range, said direction of matching and said profile defining a first set of data representing a matched surface portion, and an end position of the profile; and
selectively repeating the defining and determining steps, with the starting position being derived from a preceding end position, until a selected condition is met.

2. The method of claim 1, wherein said determining step comprises determination of an angle defining the position of the profile within a plane perpendicular to said matching direction.

3. The method of claim 2, wherein the determining step comprises the steps of: projecting cloud points within said range along a selected direction on said two-dimensional surface; and adjusting said selected direction and said angle to minimize a quantity related to the distances between the projected points and the profile.

4. The method of claim 1, wherein said two-dimensional surface of the selecting step is substantially planar.

5. The method of claim 1, wherein said defining step comprises defining the starting position of the profile in said cloud and the direction of extension of said range by four parameters.

6. The method of claim 5, wherein said four parameters comprise:
a position of a reference point in the profile, two angles defining a selected direction and the direction of extension of said range, and one angle defining the position of the profile within a plane perpendicular to said selected direction.

7. The method of claim 1, wherein the determining step comprises the steps of: projecting cloud points within said range along a selected direction on said two-dimensional surface; and adjusting said selected direction to minimize a quantity related to the distances between the projected points and the profile.

8. The method of claim 1, further comprising the step of: deriving a three-dimensional curve from said sets of data representing successive matched surface portions.

9. The method of claim 8, wherein, in the deriving step, the three-dimensional curve is derived from the profile and from reference points in the profile.

10. The method of claim 1, wherein: in the defining step, the direction of extension is substantially opposite to that of the range, and the determining and selectively repeating steps are selectively repeated.

11. The method of claim 1, wherein the sets of data representing matched surface portions or a three- dimensional curve are sent to a post processing unit for displaying an image representative of said surface portions.

12. A non-transitory computer-readable storage medium embodying a software code adapted to implement the steps of claim 1.

13. A non-transitory computer-readable storage medium tangibly embodying a program of instructions executable by a computer to perform the method claimed in claim 1.

14. A non-transitory computer-readable storage medium storing computer data which embodies instructions executable by a computer to perform the method claimed in claim 1 as received from a transmission medium.

15. An image processing apparatus, comprising:
a processor and a memory;
first data stored in said memory, representing a three-dimensional cloud of points related to a scene;
second data stored in said memory, representing a profile definable in a two-dimensional surface;
a matching function, adapted to receive parameters representing a starting position of said profile, and a range of points of the cloud adjacent to said starting position, and extending along a direction of extension away from said two-dimensional surface, said matching function being capable of determining a matching direction, along which said profile substantially fits with cloud points within said range, said direction of matching and said profile defining a matched surface portion within said range, for storage in said memory; and a controller for executing said matching function with a first starting position and a first range, and for subsequently executing said matching function with further starting positions and ranges, such a further starting position being derivable from a preceding operation of said controller.

16. The apparatus of claim 15, wherein said matching function is also capable of determining an angle defining the position of the profile within a plane perpendicular to said matching direction.

17. The apparatus of claim 16, wherein said matching function:
projects cloud points within said range along a selected direction on said two-dimensional surface; and
adjusts said selected direction and said angle to minimize a quantity related to the distances between the projected points and the profile.

18. The apparatus of claim 15, wherein said two- dimensional surface is substantially planar.

19. The apparatus of claim 15, wherein the starting position of the profile in said cloud and the direction of extension of said range are defined by four parameters.

20. The apparatus of claim 19, wherein said four parameters comprise: a position of a reference point in the profile; two angles defining a selected direction and the direction of extension of said range; and one angle defining the position of the profile within a plane perpendicular to said selected direction.

21. The apparatus of claim 15, wherein said matching function:

projects cloud points within said range along a selected direction on said two-dimensional surface;

and adjusts said selected direction to minimize a quantity related to the distances between the projected points and the profile.

22. The apparatus of claim 15, further comprising a smoothing function for joining successive matched surface portions with a joining surface portion.

23. The apparatus of claim 15, further comprising a post processing unit for displaying an image representative of said surface portions.

24. A non-transitory computer-readable storage medium embodying a software code adapted to implement the controller and matching function of claim 15.

* * * * *